United States Patent [19]

Baumgartner

[11] Patent Number: 5,141,099
[45] Date of Patent: Aug. 25, 1992

[54] BELT OVERLAY APPARATUS

[75] Inventor: Allan M. Baumgartner, Orrville, Ohio

[73] Assignee: Liquid Carbonic Corporation, Chicago, Ill.

[21] Appl. No.: 587,414

[22] Filed: Sep. 25, 1990

[51] Int. Cl.⁵ .......................................... B65G 21/18
[52] U.S. Cl. .................................. 198/778; 198/852
[58] Field of Search .............................. 198/778, 852

[56] References Cited

U.S. PATENT DOCUMENTS

| Re. 27,690 | 7/1973 | Roinestad et al. | 198/193 |
|---|---|---|---|
| 2,872,023 | 2/1959 | Bechtel, Jr. | 198/182 |
| 3,225,898 | 12/1965 | Roinestad | 198/181 |
| 3,261,451 | 7/1966 | Roinestad | 198/193 |
| 3,348,659 | 10/1967 | Roinestad | 198/136 |
| 3,363,744 | 1/1968 | Green et al. | 198/778 |
| 3,439,795 | 4/1969 | Roinestad et al. | 198/193 |
| 3,467,239 | 9/1969 | Roinestad | 198/195 |
| 3,733,848 | 5/1973 | Duron et al. | 62/381 |
| 3,938,651 | 2/1976 | Alfred et al. | 198/136 |
| 4,078,655 | 3/1978 | Roinestad | 198/778 X |
| 4,333,318 | 6/1982 | Tyree, Jr. | 62/374 |
| 4,565,282 | 1/1986 | Olsson et al. | 198/778 |
| 4,741,430 | 5/1988 | Roinestad | 198/778 |
| 4,846,339 | 7/1989 | Roinestad | 198/852 |
| 4,858,750 | 8/1989 | Cawley | 198/778 |
| 4,867,301 | 9/1989 | Roinestad et al. | 198/852 |
| 4,878,362 | 11/1989 | Tyree, Jr. | 62/381 |

OTHER PUBLICATIONS

Copy of a United States Patent and Trademark Office Official Gazette listing of U.S. Letters Patent No. 4,867,301.

Six-page advertising brochure by Ashworth Brothers, Inc., entitled, "Ashworth Does It Again."

*Primary Examiner*—D. Glenn Dayoan
*Attorney, Agent, or Firm*—Fitch, Even, Tabin & Flannery

[57] ABSTRACT

An overlay apparatus for use in a conveyor belt which extends in a first direction and which includes a plurality of transverse rods extending between opposed edges of the belt. The overlay apparatus includes an overlay body bent at regularly spaced intervals to form a sinuous configuration with generally straight interior portions extending from respective curved end portions. The overlay body is bent so that the curved end portions thereof are aligned along a pair of spaced generally parallel lines.

30 Claims, 5 Drawing Sheets

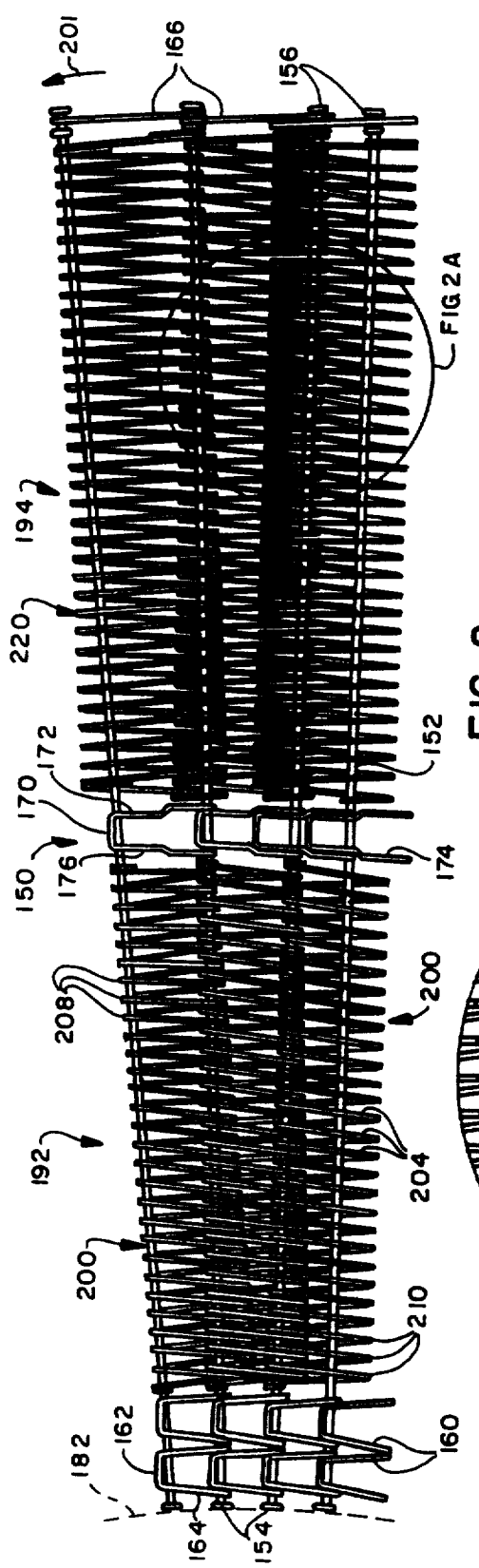
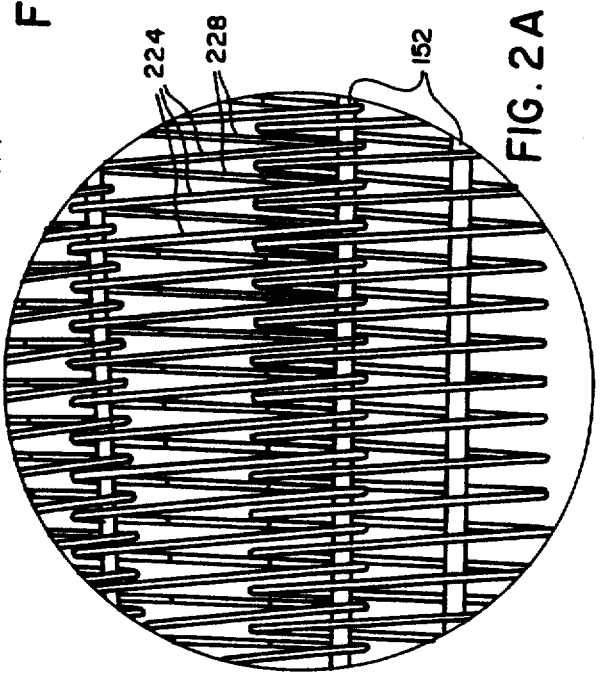
FIG. 2
FIG. 2A

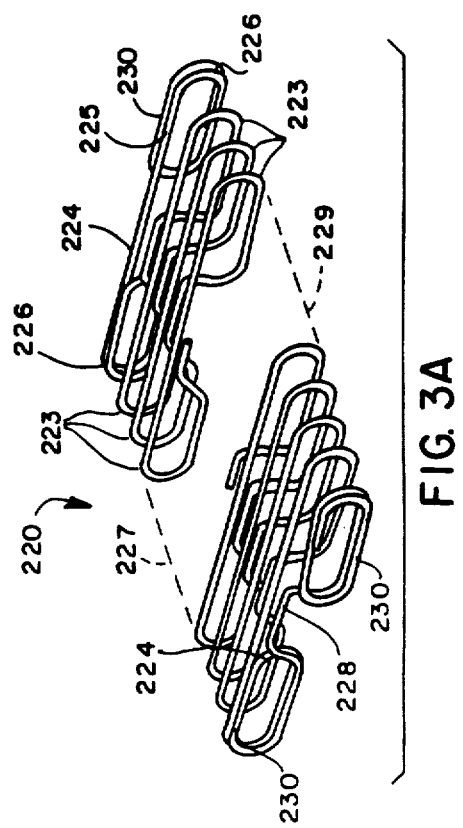
FIG. 3A
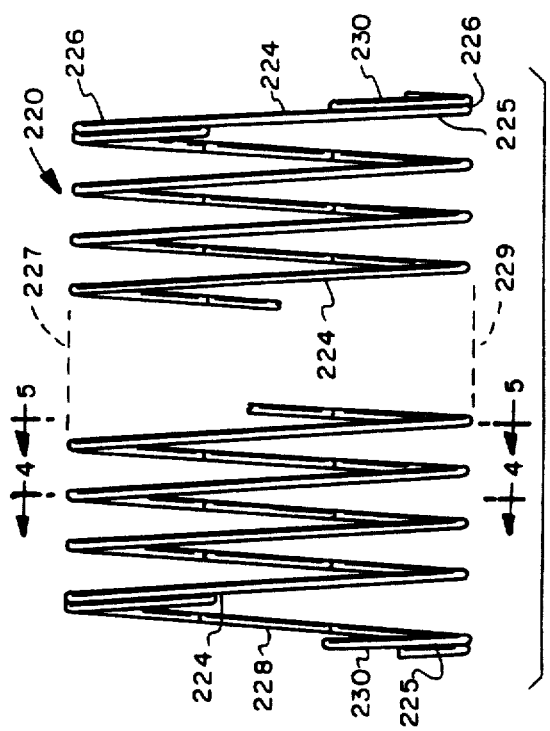
FIG. 3
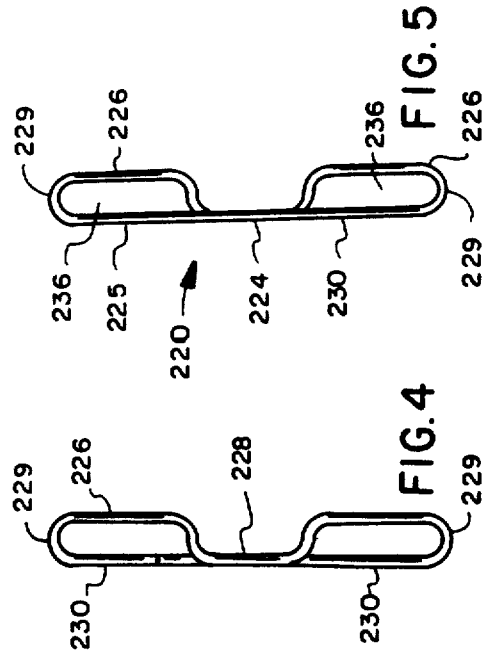
FIG. 5
FIG. 4

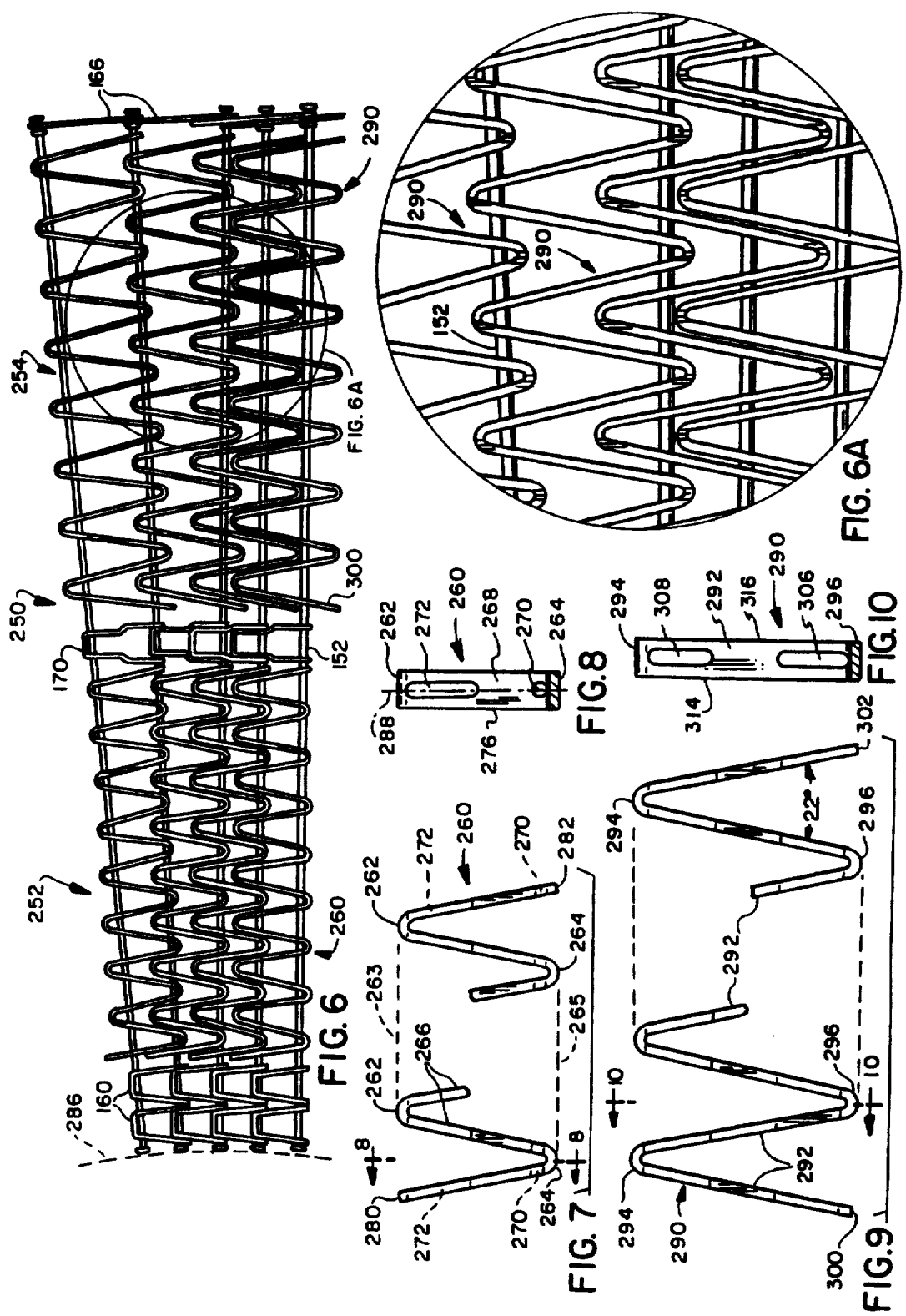

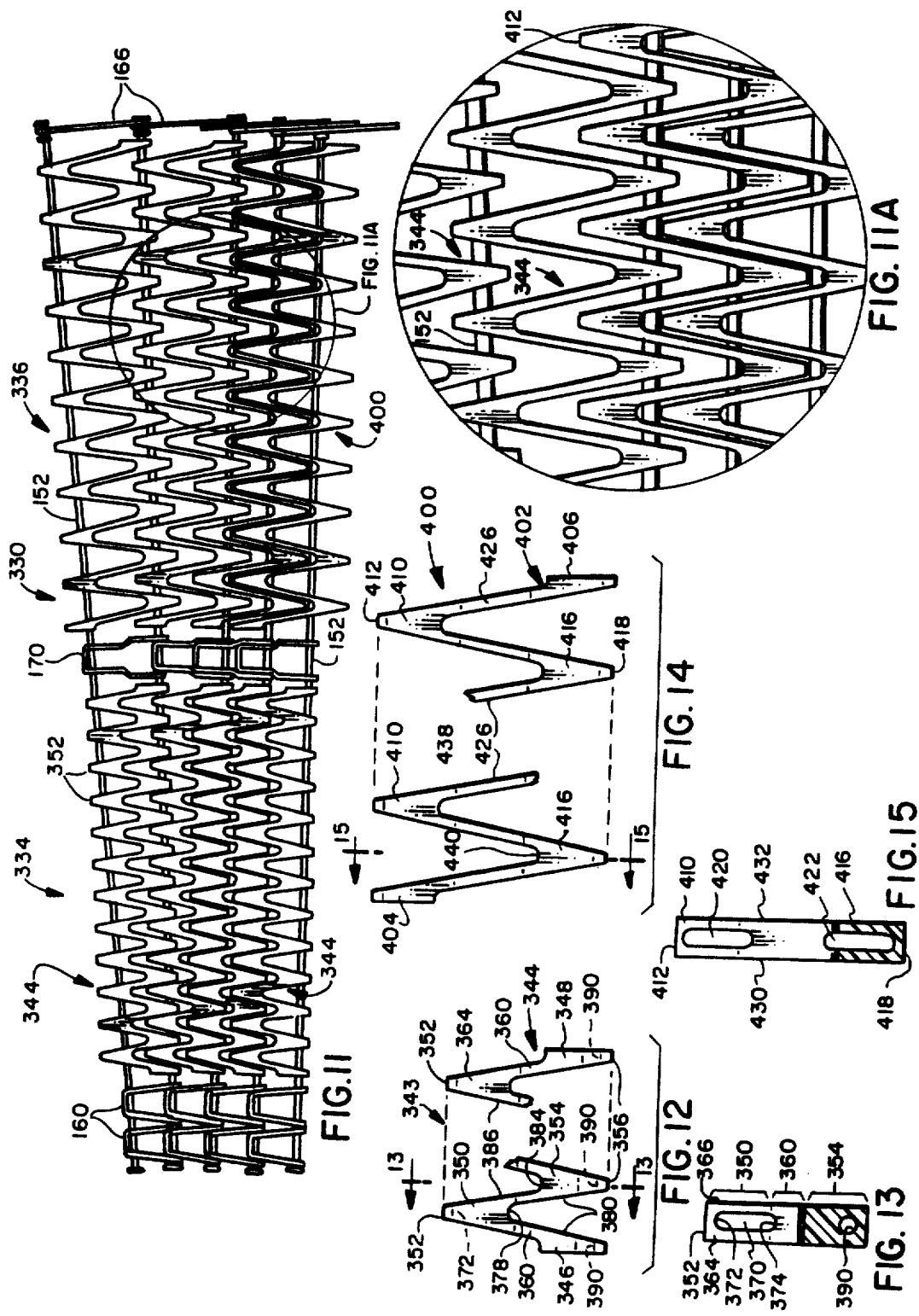

BELT OVERLAY APPARATUS

BACKGROUND OF THE INVENTION

1. Field of the Invention:

The present invention pertains to conveyor belts, especially those used in refrigeration apparatus, and more particularly in helical conveyor belt apparatus for use in spiral freezers.

2. Description of the Related Art:

Commercial refrigeration apparatus frequently employs conveyor belts to continuously move product through the refrigerated environment, in order to increase freezer throughput. A need has arisen for nonlinear conveyor arrangements which increase the residence time of products in the refrigerated environment. In such conveyor arrangements, the conveyor belt transporting products through the enclosure is made to traverse one or more helical paths, commonly termed "spiral" paths in the industry. So-called spiral freezers employ insulated enclosures which reduce the exterior surface area while increasing the interior volume in which the refrigerated environment is contained.

Conveyor belts in spiral freezers must undergo a change in configuration at the point of transition where a straight line path section entering the refrigerated environment enters the helical path section within the enclosure interior. The change in configuration requires that the conveyor belt undergo a contraction at its radially inner edge and/or an expansion at its outer edge. It is important that such transitions be smooth and do not disturb products carried on the conveyor belt. Frequently, a transition of the type referred to above is accompanied by a relative movement of components internal to the belt conveyor. More specifically, those components forming the upper surface of the conveyor belt, that surface in contact with the products being cooled by the refrigeration apparatus, undergo a relative movement along the length of the conveyor belt, and hence may disturb products borne by the conveyor belt.

There have been continuing efforts to reduce disturbances at the conveyor belt support surface. For example, commonly assigned U.S. Pat. No. 4,878,362 provides a conveyor belt so constructed that upon entering a helical path section from a straight line path section, the conveyor belt undergoes expansion only. The conveyor belt includes a plurality of transverse rods having ends located at lateral edges of the conveyor belt. Bent wire sections are wrapped about adjacent pairs of transverse rods and interconnect the rods to form an open weave support surface at the upper edge of the conveyor belt. The bent wire sections resemble a conical wrapping of wire wound with a relatively loose pitch, flattened at its top portion, to form an upper discontinuous planar support surface. The upper planar surface is the product's support surface and, since the belt undergoes expansion only at the transition point, a minimum disturbance to products on the belt is experienced.

Although the conveyor belt of U.S. Pat. No. 4,878,362 has been met with wide acceptance in the industry, certain improvements have been sought. For example, in the bent wire sections of U.S. Pat. No. 4,878,362, the lower portions of the bent wire sections are bent to form an inverted U-shape, the bight portion of which is aligned generally coplanar with the support surface of the belt overlay. While representing a significant improvement in minimizing the disturbance to certain products carried by the conveyor belt, attention has been focused on further reducing disturbance to delicate products such as meat patties, and to accommodate products of relatively small size.

SUMMARY OF THE INVENTION

It is an object of the present invention to provide a conveyor belt and conveyor belt overlay apparatus for use in refrigeration devices, which is compatible for use in an expand-only conveyor belt, and which has a transition point between a straight-line section and a helical path section which undergoes only expansion, and not contraction at the transition point.

Another object of the present invention is to provide conveyor belt overlay apparatus which increases the area of the support surface, while providing economies of manufacture for a fabricator of the conveyor belt.

These and other objects of the present invention which will become apparent from studying the appended description taken in conjunction with the drawings, is provided in an overlay apparatus for a conveyor belt which extends in a first direction and which includes a plurality of transverse rods extending between opposed edges of the belt, said overlay apparatus comprising:

a flat wire overlay body having an edge and an elongated cross-section, folded at regularly spaced intervals to form a sinuous configuration with generally straight interior portions extending from respective curved end portions, so as to form re entrant bends with pairs of adjacent interior portions, and so that said edge lies in a plane and extends throughout said interior portions and said end portions;

the flat wire overlay body folded so that the curved end portions thereof are aligned along a pair of spaced generally parallel lines;

the interior portions aligned generally coplanar with one another and with the end portions; and said interior portions defining pairs of apertures for receiving the conveyor belt rods therethrough, the apertures located adjacent the curved end portions.

Further objects according to the present invention are provided in a conveyor belt overlay apparatus for a conveyor belt which extends in a first direction and which includes a plurality of transverse rods, said overlay apparatus comprising:

a unitary molded overlay body of sinuous configuration having an elongated cross-section, with generally straight interior portions joined at their ends to bifurcated end portions to form re entrant bends with pairs of adjacent interior portions;

the curved end portions aligned along a pair of spaced generally parallel lines, one for each end of the overlay body, with the curved end portions aligned generally coplanar with one another and with the interior portions; and said curved end portions defining respective apertures for receiving the conveyor belt rods therethrough.

Still further objects according to the present invention are provided in a conveyor belt overlay apparatus for a conveyor belt which extends in a first direction and which includes a plurality of transverse rods, said overlay apparatus comprising:

a wire overlay body comprising an alternating series of double ended straight wire segments and double ended parallel wire segments with central portions of inverted U-shape;

generally arcuate end portions joining the ends of adjacent straight wire and parallel wire segments which are located in the interim of the apparatus;

closed coil portions of ovoid configuration interconnecting the ends of adjacent straight wire and parallel wire segments which are located at the ends of the apparatus; and the coil portions defining ovoid openings for receiving the transverse rods and confining movement thereof.

In other aspects, the present invention attains still further objects in providing a conveyor belt apparatus for moving products in a first direction, having a pair of opposed lateral edges and providing a series of generally planar support surfaces between the edges, the conveyor belt comprising a plurality of transverse rods extending between lateral edges of the conveyor, and length at the lateral edges of the conveyor belt interconnecting the ends of the rods. Conveyor belt overlay apparatus such as that apparatus described above according to the present invention, links adjacent pairs of transverse rod elements. The conveyor belt apparatus can be further provided with a plurality of centrally located links, joining transverse rods extending from the center to the lateral edges of the conveyor belt, thus forming side-by-side columns of conveyor belt columnar sections. Various types of conveyor belt overlay apparatus constructed according to principles of the present invention, are employed with the columnar sections of the conveyor belt employing different types of overlay apparatus.

BRIEF DESCRIPTION OF THE DRAWINGS

In the drawings, wherein like elements are referenced alike:

FIG. 2 is a plan view of a conveyor belt constructed according to principles of the present invention;

FIG. 2a is an enlarged plan view of a portion of the conveyor belt of FIG. 2;

FIG. 3 is a fragmentary plan view of the overlay body portion of the conveyor belt, constructed according to principles of the present invention;

FIG. 3a is a fragmentary perspective view of the overlay body constructed according to principles of the present invention;

FIG. 4 is a cross-sectional view taken along the line 4—4 of FIG. 3;

FIG. 5 is a cross-sectional view taken along the line 5–5 of FIG. 3;

FIG. 6 is a plan view of another conveyor belt constructed according to principles of the present invention;

FIG. 6a is an enlarged plan view of a portion of the conveyor belt of FIG. 6;

FIG. 7 is a fragmentary plan view of one overlay body portion of the conveyor belt of FIG. 6, constructed according to principles of the present invention;

FIG. 8 is a cross-sectional view taken along the line 8—8 of FIG. 7;

FIG. 9 is a fragmentary plan view of another overlay body portion of the conveyor belt of FIG. 6, constructed according to principles of the present invention;

FIG. 10 is a cross-sectional view taken along the line 10—10 of FIG. 9;

FIG. 11 is a plan view of another conveyor belt constructed according to principles of the present invention;

FIG. 11a is an enlarged plan view of a portion of the conveyor belt of FIG. 11;

FIG. 12 is a fragmentary plan view of one overlay body portion of the conveyor belt of FIG. 11, constructed according to principles of the present invention;

FIG. 13 is a cross-sectional view taken along the line 13—13 of FIG. 12;

FIG. 14 is a fragmentary plan view of another overlay body portion of the conveyor belt of FIG. 11, constructed according to principles of the present invention; and FIG. 15 is a cross-sectional view taken along the line 15—15 of FIG. 14.

DETAILED DESCRIPTION OF THE PREFERRED EMBODIMENTS

Figure 1:
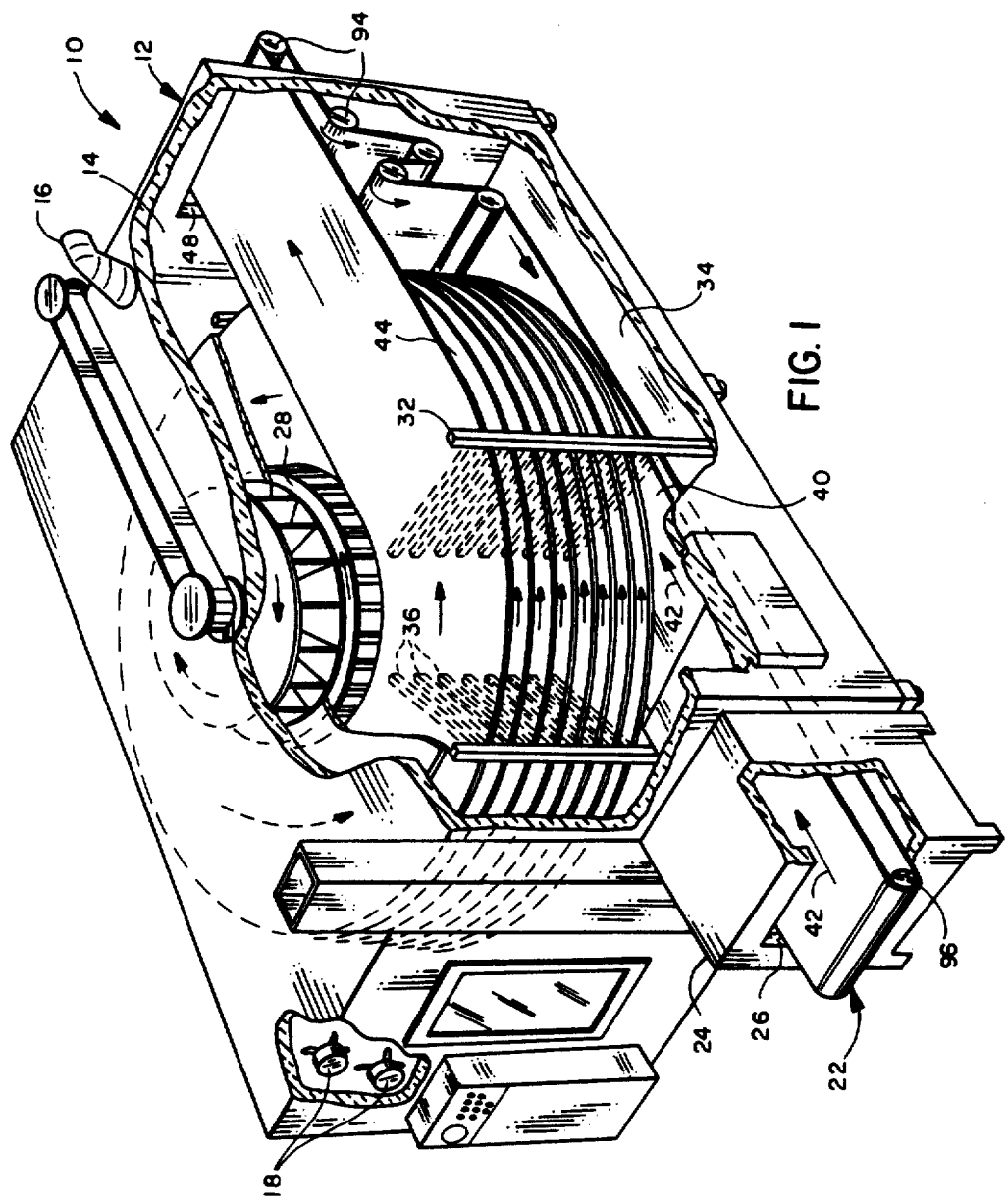
FIG. 1 is a perspective view of a refrigeration enclosure utilizing conveyor belt apparatus according to principles of the present invention.

Referring now to the drawings for purposes of illustration but not limitation, and initially to FIG. 1, a chiller or refrigeration apparatus generally indicated at 10, includes an insulated enclosure 12 having an internal cavity 14 which is maintained at below ambient temperature by a refrigeration system which is not shown. An inlet duct 16 is provided for connection to the refrigeration system and is suitable for introducing a refrigerated medium, such as refrigerated air into cavity 14, so as to chill or freeze products introduced therein. A plurality of fans 18 provide circulation for the cooling medium throughout the cavity 14. Fans 18 may be employed to direct the refrigerated air across the surfaces of a conveyor belt generally indicated at 22, so as to increase the rate of heat transfer to a point sufficient to chill or freeze products carried thereon as the products are moved through the chiller.

Enclosure 12 includes a housing 24 having an entrance opening 26 through which products loaded on the conveyor belt enter chiller 10. Disposed within cavity 14 is a cylindrical drive drum 28 of the type disclosed in U.S. Pat. No. 3,348,659. The drive drum 28 is driven by a motor, not shown, for rotation about a central axis of the drum. The drum engages the inboard or inner edge of the conveyor belt 22 so as to drive the conveyor belt along the path illustrated in FIG. 1. An outer framework has legs 32 supported by a floor 34 of the enclosure and includes a number of generally radially oriented struts 36 joined at their inner ends to the cylindrical structure. The struts 36 extend underneath the conveyor belt 22 to provide support therefor, especially at the outboard or outer edges of the belt.

As illustrated in FIG. 1, conveyor belt 22 has an initial straight-line path section 40 in which the belt passes through housing 24, travelling in the direction of the arrows 42. Restraining means such as a C-shaped channel is preferably provided along the outboard edge of the conveyor belt 22 in the straight-line sections. Thereafter, the conveyor belt 22 enters a helical path section 44, wherein a series of windings or layers of the conveyor belt are supported by the struts 36 which support the weight of the conveyor belt and products loaded thereon, and the cylindrical structure 28 which supports the conveyor belt against sideways or lateral movement.

Upon leaving the helical path section 44, the conveyor belt 22 approaches an exit opening 48 in the enclosure 12, through which products discharged from conveyor belt 22 may be removed from chiller 10. The conveyor belt is looped through a series of rollers 94 disposed along an intermediate path section so as to return to inlet housing 24. The roller 96 located upstream of housing 24 orients the belt 22 for passage along the initial straight-line path section 40, where a product may conveniently be loaded onto the conveyor belt. The roller 96 is mounted on a shaft which may be driven by a motor to assist in driving the conveyor belt along its straight-line, helical and intermediate path sections. Further features of the conveyor belt construction may be seen with reference to U.S. Pat. No. 4,878,362, the disclosure of which is incorporated by reference as if fully set forth herein.

As noted above, the conveyor belt 22 must be capable of transitioning from its straight-line configuration to the helical path configuration illustrated in the drawings. As will be seen herein, the conveyor belt 22 is comprised of a plurality of transverse support rods with belt overlay apparatus disposed thereon, forming a fabric with support surface segments, the belt being comprised of a series of such support surface segments throughout its length. At the transition where a helical path is entered, the support surface segments must undergo what may generally be referred to as a pivoting or curving displacement in the plane of the support surface portion.

The conveyor belt 22 may take on several configurations, according to various principles of the present invention. For example, the conveyor belt may comprise a "single column" construction with a continuous overlay construction between lateral edges of the belt. Alternatively, the belt may be constructed so as to have a "two-column" arrangement with centrally located links dividing the belt into a radially inner column, and a radially outer column, wherein each column may have a different conveyor belt overlay construction.

One feature of the present invention is that the various embodiments of the conveyor belt overlay apparatus are compatible for use with expand-only conveyor belts such as those disclosed in U.S. Pat. No. 4,878,362. With the various embodiments of overlay apparatus according to the present invention, the support surface of the conveyor belt is significantly increased over that provided by U.S. Pat. No. 4,878,362, thus adding to the continuity of the support surface by the expand-only features of the conveyor belt.

However, those skilled in the art will also readily appreciate that the overlay apparatus according to the present invention can also be employed with other types of conveyor belt systems, such as those where the belt undergoes a contraction at its radially inner end or both a contraction at its radially inner end and an expansion at its radially outer end as the belt transitions from a straight-line portion to a helical path or other curved path portion. Significant advantages are attained by overlay apparatus according to the present invention which provides an increased surface area, especially along the helical path portions of the conveyor belt, and which may be employed with existing rod and link conveyor belt apparatus without requiring modification thereto, thus providing economic advantages in providing a retrofit conversion for existing conveyor belts.

Referring now to FIG. 2, a conveyor belt generally indicated at 150 includes a plurality of transverse rods 152 having enlarged heads 154 at their inside ends and enlarged heads 156 at their outside ends. Pairs of connector links 160 are located adjacent the inside of conveyor belt 150, each link having a pair of slots adjacent its upstream end 162 and a pair of apertures at its open downstream end 164. The rods 152 are received in the apertures of links 160, such that each link unites two adjacent rods. At the outside edge of the conveyor belt, the transverse rods 152 are pinned together by flat links 166, similar to the flat links of U.S. Pat. No. 4,878,362. Disposed at the central portion of belt 150 are stirrup-shaped links 170 having leading ends 172 and trailing ends 174, and an intermediate lateral offset portion 176.

The links 170 are constructed according to U.S. Pat. No. 4,878,362 and the links 160 are similar thereto, except for the rounded corners and the omission of the intermediate lateral offset portions. As can be seen in the plan view of FIG. 2, the links 160 are generally trapezoidal in configuration. The location and size of the rod-receiving slots are substantially similar for both links 160, 170.

Each of the links 160, 166 and 170 link or join pairs of transverse rods 152. The links cooperate with the transverse rods such that the conveyor belt undergoes expansion only as it transitions from a straight path portion indicated by the bracketed portion 180 at the bottom of FIG. 2, and a helical or other curved path portion shown at the top, remaining portion of FIG. 2. Thus, by following the teachings of U.S. Pat. No. 4,878,362 the transverse rods 152 and the connecting links, 160, 166 and 170 cooperate such that the conveyor belt 150 does not experience contraction as it undergoes a transition from a straight-line portion to a curved path portion.

The conveyor belt 150 illustrated in FIG. 2 is an example of what may be termed a "double-column" belt having two product-supporting column portions arranged side-by-side, and separated by the centrally located series of stirrup-shaped links 170. The conveyor belt 150 is illustrated in FIG. 2 as undergoing a turn in the direction of arrow 201 with the enlarged heads 154 of rods 152 forming a radially inner edge of the conveyor belt, travelling a curved path indicated by dot-dash line 182. Line 182 indicates the outer surface of a central cage assembly of conventional construction, which guides and supports the conveyor belt 150 along a helical path.

As mentioned, the lower portion 180 of the conveyor belt illustrated in FIG. 2 is traversing a straight-line portion, with downstream portions of the conveyor belt undergoing a turning or curving in the direction of arrow 201, generally in the plane of the conveyor belt upper support surface. As can be seen by studying FIG. 2, the rods 152 at the radially inner end of the conveyor belt undergo a pivoting but not a contraction, whereas the radially outer edge of the conveyor belt formed by the series of enlarged heads 154, undergoes an expansion, as the conveyor belt turns to enter the helical path portion. Of course, the conveyor belt 150 can also undergo a reconfiguration so as to follow an upward or downward path as it travels along the belt direction indicated by arrow 201. The conveyor belt overlay apparatus according to principles of the present invention can freely move in the direction of the conveyor belt, as explained above, while maintaining a smoothly transitioning support surface for products placed on top of the conveyor belt.

Referring again to FIG. 2, the conveyor belt 150 includes a radially inner portion or product support column generally indicated at 192 and a radially outer portion or product support column generally indicated at 194. The product support column extending between links 160, 170 is comprised of the radially inner portions of rods 152 and a series of wound wire coils generally indicated at 200, of conventional construction, resembling for example the wire netting of U.S. Pat. No. 3,938,651. Alternatively, the wire coils 200 could be replaced with the wire mesh units of U.S. Pat. No. 4,878,362 which increase the upper, product-supporting surface of the wire coils.

In their simplest form, the wire coils 200 resemble a helical coil which is flattened at its top and bottom edges, the top edges forming a series of coplanar straight wire portions 204 forming the upper product-supporting surface of the conveyor belt. As can be seen in FIG. 2, each wire coil 200 links a pair of support rods 152 and has end portions internested with neighboring wire coils 200, such that each rod 152 is linked to a pair of adjacent wire coils 200. The wire coils 200 of the support column 192 cooperate to form a wire mesh which is capable of limited independent movement from one pair of support rods to another, and the upper surface of which comprises the product supporting surface on which the product to be transported through the freezer rests.

As mentioned, the wire coils 200 are of a simple construction, with each turn of the coil comprising only a single loop. As can be seen at the top portion of FIG. 2, a coil 200 is comprised of a linear series of curved end portions 208 which are aligned for simultaneous or near simultaneous engagement with a rod 152 at various times during operation of the conveyor belt. With reference to the bottom portion of FIG. 2, the opposed, downstream portion of coils 200 is comprised of similar curved end portions 210, also colinearly aligned so as to provide simultaneous or near simultaneous contact with a rod 152. The hollow interior or passageway for each coil 200 is open between its end portions 208, 210, the winding or turn of the coil is ovoid, resembling an oval in elevational view. Preferably, all of the coils of support column 192 are of the same type, herein the single loop open coil construction 200 described above. The wire coils 200, as explained, are of conventional construction and do not form part of the present invention. The coils 200 could be replaced by other conventional wire coil constructions, such as described in U.S. Pat. No. 4,878,362, for example.

Referring to FIG. 2a and again to FIG. 2, the outer support column 194 includes the outer portions of rods 152 and a novel overlay fabric comprised of a series of overlay bodies or wire coils 220 having double loop ends. Referring additionally to FIGS. 3-5, the ends of a wire coil 220 comprises a series of straight wire segments 224 joined at each end to a double loop end portion 226. The remainder of coil 220 is comprised of straight wire segments 224 joined at the ends thereof to single loop end portions 223. The double loop end portions 226 are aligned with the single loop end portions 223 along spaced parallel lines 227, 229 located at the upstream and downstream ends of the wire coil 220 (see FIG. 3a). The end portions 223 and 226 are connected together through parallel wire segments 228 of inverted, generally U-shape (see FIGS. 3a and 4). Referring additionally to FIG. 5, the straight wire segments 224 are located at the upper portion of wire coil 220, and have a generally horizontal configuration, assuming the conveyor belt is oriented along a horizontal axis.

As can be seen in FIG. 4, the parallel wire segment 228 is of generally inverted U-shaped configuration having a central bight portion aligned coplanar with the straight-wire segment 224, and thus contributing to the product support surface lying in that plane. The double loop end portions 226 extend from the parallel wire segments 228 to form a bottom portion of the wire coil 220. The end portions 226 have outside bends 229 which are preferably part circular in configuration, extending upwardly to an upper support portion 230 located immediately adjacent to an end portion 225 of straight wire segment 224 and aligned coplanar therewith, further contributing the product support surface of wire coil 220. Referring to the right-hand portion of FIG. 5, the end portion 226 is connected to one end of a straight-wire segment 224, and thus the wire coil 220 may be formed from a continuous length of wire material, preferably a round wire material of suitable size. As can be seen in FIGS. 4 and 5, the end portions 226 form ovoid passageways 236 therein, through which the support rods are inserted. Further, as can be seen in FIG. 4, the end portions of parallel wire segment 228 are aligned with the end portions 226 so as to form part of the ovoid passageway confining the movement of rods 152.

As can be seen from the above, the end portions 226 form approximately 1½ loops surrounding the support rod 152 and cooperate with the straight wire and parallel wire segments 224, 226 to provide a heretofore unattainable control over the support rod ends, while maintaining compatibility with expand-only conveyor belt systems. It is preferred that the wire coils 220 be located in the radially outer column 194 of conveyor belt 150, although those skilled in the art will readily appreciate that the wire coils 220 could also be employed in a single column conveyor belt wherein the wire coils extend between the conveyor belt lateral edges.

Referring now to FIG. 6, an alternative embodiment of a double column conveyor belt assembly is generally indicated at 250. The conveyor belt portion is formed of radially inner trapezoidal links 160, central stirrup-shaped links 170 and radially outer flat links 166 which are the same as those described above with reference to FIG. 2. As will be seen herein, the overlay fabric of the inner and outer support columns 252, 254 are of novel construction, being formed of flat wire material. Referring additionally to FIG. 7, the overlay apparatus of inner support column 252 is comprised of a series of flat wire overlay bodies 260 folded so as to have colinear aligned curved end portions 262, 264, joining generally straight line interior portions 266. The end portions 262, 264 and the interior portions 266 have coplanar aligned upper edge surfaces forming the product-supporting surface of the conveyor belt, and contributing individually to the support surface of the flat wire mesh when installed on the rods 152, located between radially interior links 160 and the central links 170.

As can be seen in the lower portion of FIG. 8, the body 260 has an elongate, generally rectangular cross-section which preferably is maintained continuous throughout the length of the flat wire body. Body 260 is preferably formed by bending or folding a continuous strip of flat wire material back and forth to form the sinuous or zig-zag configuration visible in FIG. 7. The folding is carried out such that the end portions 262 are aligned along a reference line 263, parallel to and spaced from the reference line 265, along which the opposed ends 264 are aligned. The reference lines 263, 265 extend along upstream and downstream ends of the flat wire overlay body 260.

With reference to FIG. 8, the flat wire body is preferably stamped or punched prior to folding so that each straight segment 266 has a pair of apertures formed therein for receiving respective rods 152 therethrough. According to one aspect of the present invention, the apertures in each straight segment are of dissimilar configuration, one aperture, designated by reference numeral 270, having a smaller size and a round or circular configuration is positioned immediately adjacent the rounded end portion 264. The remaining aperture 272 has a larger, ovoid, or generally oval configuration with a longitudinal axis aligned along the longitudinal axis of the straight segment 266, and an end portion immediately adjacent the rounded end portion 262. The edge 276 of body 260 extends throughout the straight segment 266 and the rounded end portions 262, 264 and forms a portion of the product support surface which is provided throughout the length of flat wire body 260.

As can be seen in FIG. 7, the radially inner end 280 of flat wire body 260 is aligned with the end portions 262, whereas the opposed, radially outer end 282 is aligned with the end portions 264. This arrangement is provided for a left-hand or counterclockwise spiral conveyor path, with a support cage represented in FIG. 6 by dot-dash line 286, lying to the left or radial interior of end 280. The flat wire body 260 is symmetric about a horizontal center line shown in FIG. 8, so that the same flat wire body portion 260 can be inverted end-to-end to accommodate a right-hand or clockwise spiral where the cage would be located to the right-hand end of the flat wire body. With an end-to-end inversion, the end 280 is again located adjacent the cage with no modifications being necessary to accommodate an oppositely directed spiral belt path.

Referring now to FIGS. 6, 9 and 10, the flat wire mesh of radially outer support column 254 is comprised of a series of flat wire overlay bodies 290. The flat wire body 290 is, in some respects, similar to the aforedescribed flat wire body 260 and comprises intermediate portions 292 disposed between end portions 294, 296. The end portions 294 are of rounded configuration and are colinearly aligned at the upstream edge of the flat wire body. In the preferred embodiment, the radially inner end 300 of body 290 is located adjacent the central links 170. Alternatively, the flat wire bodies 290 can be used alone, in a single column conveyor, with the ends 300 located adjacent the center drive cage of the conveyor apparatus. The opposed end 302 of body 290 is colinearly aligned with the rounded end portions 296, along a line parallel to and spaced apart from the line along which rounded end portions 294 are aligned. Thus, the ends 300, 302 of body 290 are both located at the downstream end of flat wire body 290, in contrast to the aforedescribed flat wire body 260 having oppositely directed ends.

Referring now to FIG. 10, the flat wire body is preferably comprised of a continuous, unitary flat wire material having an elongated, preferably rectangular cross-section, as shown in FIG. 10. Each straight segment has a pair of rod-receiving apertures 306, 308 which are both of a ovoid configuration, the longitudinal axes of the apertures being aligned along the longitudinal axis of the straight segments 292. Preferably, one end of ovoid aperture 306 is positioned immediately adjacent rounded end portion 296. Similarly, one end of elongated ovoid aperture 308 is positioned immediately adjacent the other rounded end portion, 294. Thus, as with the aforedescribed flat wire body 260, it is the rounded end portions of flat wire body 290 which contact and confine movements of support wires 152.

As explained above, the conveyor belt 250 illustrated in FIG. 6 is configured for a counterclockwise spiral, one in which the cage is located to the left-hand end of the conveyor belt. For oppositely directed spirals, in which the cage is located to the right-hand end of the conveyor belt (as viewed from above,) the flat wire body portion 290 must be rotated or inverted about its longitudinal axis, so as to bring the rounded end portions 296 at the upstream end of the body and the rounded end portions 294 at the downstream end of the body, such that the ends 300, 302 are at the leading edge of the flat wire body portion as the conveyor belt is moved along its path of travel. With reference to FIG. 10, it is therefore preferred that the edge 316 of the flat wire body portion form a plane to allow the aforementioned inversion so as to accommodate oppositely directed spirals, thus reducing inventory and investment tooling. For the configuration illustrated in the figures, the edge 314 which extends throughout the flat wire body, forms the planar upper support surface in contact with the product being transported through the freezer apparatus. Together, the edges 314 of the series of flat wire bodies 290 form the upper support surface of the open wire work mesh of outer support column 254.

The flat wire bodies 260, 290 are both of a sinuous configuration forming a series of V-shaped bends, wherein the angle enclosed by each V-shaped end portion is preferably acute, ranging between 15° and 40°, most preferably forming an included angle of 22°. This allows a convenient nesting of adjacent flat wire body portions, as illustrated in FIG. 6. As with the other embodiments of overlay apparatus constructed according to principles of the present invention, each flat wire body portion receives a pair of support rods, and each support rod is linked to a pair of adjacent flat wire body portions.

The apertures 306, 308 of the flat wire body portions 290 are dimensioned such that the upstream rounded end portions 294 thereof abut an upstream connecting rod, to cooperate with an upstream body portion in aligning the support rod. The flat wire body portions 260, 290 of the inner and outer support columns are internested one in another, being more deeply internested in the straight conveyor belt portion.

Referring now to FIG. 11, another alternative embodiment of an overlay apparatus constructed according to principles of the present invention, will be described. The overlay apparatus is shown installed on a two-column conveyor belt construction, comprised of inner connecting links 160, central connecting links 170 and outer flat links 166. Interconnecting rods 152 extend between lateral edges of the conveyor belt 330. As with the preceding embodiments, a first type of overlay body is provided throughout the inner support column 334 and a different overlay body is provided throughout the outer support column 336.

Referring now to FIG. 12, the radially inner support column 334 comprises an overlay apparatus including a unitary molded overlay body 344 having a radially inner end 346 and a radially outer end 348. Body 344 includes bifurcated end portions 350 having outer edges 352 colinearly aligned along a leading edge of body 344.

Substantially similar bifurcated end portions 354 have colinearly aligned free edges 356. The free edges 352, 356 are aligned parallel to one another. Generally straight interior portions 360 are disposed between the bifurcated end portions 350, 354. As can be seen from FIG. 12, a bifurcated end portion cooperates with a pair of adjacent interior portions 360 to form a re entrant bend therewith, giving body 344 a sinuous or zig-zag configuration. The bifurcated end portions and the interior portions of body 344 have coplanar upper surfaces, comprising the support surface which carries the product through the freezer.

With reference to FIG. 13, it can be seen that the body 344 has a substantial thickness between its upper surface 364 and its lower surface 366. Each bifurcated end portion has an aperture formed therein. The radially interior overlay apparatus according to the present invention has an elongated generally oval aperture 370 formed adjacent the leading edge of the overlay apparatus in the bifurcated end portions 350. The ovoid aperture 370 has an outer end 372 adjacent the leading edge 352, and an inner end 374. The bifurcated end portion 350 extends from a line passing through the end 374 of aperture 370 to edge 352.

As seen in FIG. 11, the bifurcated end portions 350 include a rounded interior edge 378 which blends with the generally truncated triangular outer edges 380 of end portions 354 to form a continuous V-shaped edge surface with a rounded tip. Similarly, the opposed bifurcated end portions 354 include rounded edge surfaces 384 which are blended with the generally truncated triangular surfaces 386 of end portions 350, forming a V-shaped recess with a rounded tip. The intermediate interior portions 360 are blended with the rounded surfaces of adjacent bifurcated end portions and have a generally rectangular cross-section, having the smallest cross-sectional area of body 344.

According to one aspect of the present invention, the elongated ovoid slots 370 have a pair of spaced apart interior end surfaces 374, for each end portion, thus increasing the control over the position of a support rod inserted therethrough. According to one aspect of the present invention, the interior surfaces 374 of the series of bifurcated end portions 350 are colinearly aligned one with another, along a line which is preferably parallel to the leading and trailing ends 352, 356 of body 344 and is also parallel to the line of colinear alignment of interior end surfaces 372 of aperture 370.

According to other aspects of the present invention, the bifurcated end portions 354 have generally cylindrical apertures 390 formed therein, the cylindrical apertures are coaxially aligned one with another, preferably aligned parallel with the end surfaces 352, 356 of body 344.

Referring again to FIG. 13, it can be seen that body 344 fits within an imaginary outer envelope which is generally rectangular in cross-section. Preferably, the underneath surface 366 of body 344 has a flat, planar configuration to aid in assembly, with either surface 364, 366 providing the upper product supporting surface. It can be seen that the body 344 is symmetric about a center line extending perpendicular to the longitudinal axis of the body, the end portions 346, 348 being mirror images of one another. Accordingly, the body 344 in its most preferred embodiment can be inverted, end-to-end during assembly on a conveyor belt, thus speeding the assembly process.

Referring now to FIG. 14, overlay apparatus 400 for the outer support column will now be described. It will be noted that overlay apparatus 400 shares many of the features described above with respect to the radially inner overlay apparatus 343. Overlay apparatus 400 includes a unitary, preferably molded, body 402 of sinuous configuration, with radially inner and outer ends 404, 406, respectively. Body 402 includes bifurcated end portions 410 with outer end faces 41 comprising the leading or upstream end of the overlay body.

Bifurcated end portions 416 have outer end faces 418 at the trailing or downstream end of the overlay apparatus. Unlike the aforementioned radially inner overlay apparatus 343, the radially outer overlay apparatus 400 is not symmetric with respect to a center line extending along the direction of belt travel. That is, the radially inner end portion 404 is located adjacent the leading edge of the overlay apparatus, whereas the opposing radially outer edge 406 is located adjacent the trailing edge. However, as can be seen in FIG. 15, the apertures 420, 422 formed in bifurcated end portions 410, 416 are substantially identical, both comprising elongated, ovoid apertures. Further, the apertures 420, 422 are similarly disposed with respect to their adjacent leading and trailing end faces 412, 418, respectively.

Disposed between bifurcated end portions 410, 416 are generally straight interior portions of generally rectangular cross-section. According to one aspect of the present invention, the upper surfaces of the end portions 410, 416 are aligned coplanar with the upper surfaces of interior portions 426, together comprising the upper support surface 430 of the overlay apparatus. Preferably, the opposing underneath surface 432 of the overlay apparatus is also of a flat, planar configuration, to impart a symmetry to the body 402 whereby either end can be located at the radially inner end of the outer support column. For example, the body 402 illustrated in FIG. 14 can be inverted end-to-end and inverted about its longitudinal axis to thereby speed the assembly process.

As with the aforementioned radially inner overlay apparatus 343, the body 402 of overlay apparatus 400 has rounded surfaces 438 formed at the interior of bifurcated end portions 410, and rounded surfaces 440 formed in bifurcated end portions 416, the rounded end portions cooperating with the straight interior sections 426 and the outer surfaces of opposing end portions to form recesses of generally V-shaped configuration having a rounded tip.

Referring again to FIG. 11, it can be seen that the slots of the radially inner support column 334 are dimensioned such that the leading edges 352 remain out of contact with an adjacent upstream rod 152, even when the conveyor belt is aligned along a straight section. However, the slots 420, 422 of the outer overlay apparatus 400 are dimensioned such that the leading end faces 412 do contact an upstream rod 152 in the straight line portions of the conveyor belt, and that the downstream end faces 418 of the overlay body contact an adjacent downstream support rod thus providing for each support rod, a continuous channel of very closely spaced support surfaces, each rod being confined by the pairs of interior slot surfaces of the end portions of one overlay body, and the upstream or downstream outside edges of an adjacent overlay body, thus providing a heretofore unattainable control over the support rods in the straight portions of the conveyor belt.

Thus, it can be seen that the present invention provides a variety of overlay apparatus which can be used with expand-only conveyor belt arrangements and which provide product-contacting support surfaces of heretofore unattainable density, further contributing to the advantages of an expand-only conveyor belt in assuring that products carried on the overlay arrangements will not be disturbed as they travel curved or spiral portions of a conveyor belt path. Further, the overlay apparatus according to the present invention can also be used with conveyor belt arrangements which undergo compression as well as expansion as the belt transitions from a straight line portion to a curved or spiral portion.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. An overlay apparatus for a conveyor belt which extends in a first direction and which includes a plurality of transverse rods extending between opposed edges of the belt, said overlay apparatus comprising:

an overlay body of flat wire construction having an elongated cross-section and an upper support surface and bent at regularly spaced intervals to form a sinuous configuration comprising a series of re-entrant bends formed by curved end portions having rounded, part-circular configurations and joined to paris of adjacent interior portions, the upper support surface lying in a plane and extending throughout said interior portions and said end portions;

the flat wire overlay body bent so that the curved end portions thereof are aligned along a pair of spaced generally parallel lines; and said interior portions defining pairs of apertures for receiving the conveyor belt rods therethrough, the apertures located adjacent the curved end portions.

2. The apparatus of claim 1 wherein one aperture of each interior pattern is elongated in the first direction.

3. The apparatus of claim 1 wherein each aperture of each interior portion is elongated in the first direction.

4. The apparatus of claim 1 wherein pairs of adjacent intermediate portions which are joined to a common curved end portion are angularly displaced one from another with a generally constant angular displacement throughout the overlay apparatus.

5. A conveyor belt apparatus for moving products in a first direction, having a pair of opposed lateral edges, the conveyor belt providing a series of generally planar support surfaces between the edges and having internal components which move to allow the lateral edges to curve generally in the plane of the support surface so as to follow helical path, the conveyor belt comprising:

a plurality of transverse rods extending between the lateral edges of the conveyor;

links at the lateral edges of the conveyor interconnecting the ends of the rods;

a plurality of overlay sections, each comprising:

(a) a flat wire overlay body having an upper support surface and an elongated cross-section, bent at regularly spaced intervals to form a sinuous configuration with generally straight interior portions extending from respective curved end portions having rounded, part-circular configurations, so as to form re-entrant bends with pairs of adjacent interior portions, and so that said upper support surface lies in a plane and extends throughout said interior portions and said end portions;

(b) the flat wire overlay body bent so that the curved end portions thereof are aligned along a pair of spaced generally parallel lines;

(c) the interior portions aligned generally coplanar with one another and with the end portions; and (d) said interior portions defining pairs of apertures for receiving the conveyor belt rods therethrough, the apertures located adjacent the curved end portions.

6. The apparatus of claim 5 wherein the rods and links are interconnected so that there is substantially no provision for relative expansive longitudinal movement along one edge of the belt, whereas interconnections along the other edge of the belt permits relative expansive longitudinal movement of an amount sufficient to accommodate an increase in distance which occurs during a transition of the belt from a straight-line path configuration to a curved configuration along a helical path, so that radially outer regions of the belt undergo only longitudinal expansion when the belt changes its orientation during a transition from a straight-line path section to a helical path section.

7. The apparatus of claim 5 further comprising inner links in the interior of the conveyor belt so as to divide the overlay apparatus into two side-by-side portions, one alongside the other, with separate overlay bodies in each portion joined to common support rods and separated by said inner links.

8. The apparatus of claim 7 wherein the overlay bodies of one portion are smaller than the overlay bodies of the other portion so that the curved end portions thereof lie along parallel lines more closely spaced than with the overlay bodies of the other portion.

9. An overlay apparatus for a conveyor belt which extends in a first direction and which includes a plurality of transverse rods, said overlay apparatus comprising:

a unitary molded overlay body of sinuous configuration having an elongated cross-section, with generally straight interior portions joined at their ends to bifurcated curved end portions to form re entrant bends with pairs of adjacent interior portions, the curved end portions having internal surfaces of generally curved configuration and external surfaces of truncated V-shaped configuration, with a solid molded body potion between the internal and external surfaces;

the external surfaces of the curved end portions aligned along a pair of spaced generally parallel lines, located adjacent upstream and downstream ends of the overlay body, with the interior portions having upper surfaces and with the curved end portions having upper surfaces aligned generally coplanar with one another and with the upper surfaces of the interior portions; and said curved end portions defining respective apertures for receiving the conveyor belt rods therethrough.

10. The apparatus of claim 9 wherein the overlay body defines two series of apertures, each for receiving a respective conveyor belt rod, with the apertures of one series elongated in the first direction.

11. The apparatus of claim 10 wherein the apertures of both series are elongated in a direction extending between adjacent curved end portions.

12. The apparatus of claim 9 wherein pairs of adjacent curved end portions extending along one end of the overlay body cooperate to form a recess for receiving an end portion of an adjacent similar overlay body for internesting relationship therewith when the conveyor belt is in a collapsed configuration.

13. The apparatus of claim 9 wherein the curved end portions have truncated V-shaped tips with generally coplanar end faces.

14. A conveyor belt apparatus for moving products in a first direction, having a pair of opposed lateral edges, the conveyor belt providing a series of generally planar support surfaces between the edges and having internal components which move to allow the lateral edges to curve in the plane of the support surface, the conveyor belt comprising:
a plurality of transverse rods extending between the lateral edges of the conveyor;
links at the lateral edges of the conveyor interconnecting the ends of the rods;
a plurality of overlay sections linking adjacent pairs of transverse rod elements, each comprising:
a unitary molded overlay body of sinuous configuration having an elongated cross-section, with generally straight interior portions joined at their ends to bifurcated curved end portions to form re entrant bends with pairs of adjacent interior portions, the curved end portions having internal surfaces of generally curved configuration and external surfaces of truncated V-shaped configuration, with a solid molded body portion between the internal and external surfaces;
the external surfaces of the end portions of the overlay body aligned along a pair of spaced generally parallel lines, one at each end of the overlay body, with the interior portions having upper surfaces and with the end portions having upper surafces aligned generally coplanar with one another and with the upper surfaces of the interior portions; and
said end portions defining respective apertures for receiving the conveyor belt rods therethrough.

15. The apparatus of claim 14 wherein the rods and links are interconnected so that there is substantially no provision for relative expansive longitudinal movement along one edge of the belt, whereas interconnections along the other edge of the belt permit relative expansive longitudinal movement of an amount sufficient to accommodate an increase in distance which occurs during a transition of the belt from a straight-line path configuration to a curved configuration along a helical path, so that radially outer regions of the belt undergo only longitudinal expansion when the belt changes its orientation during a transition from a straight-line path section to a helical path section.

16. The apparatus of claim 14 further comprising inner links in the interior of the conveyor belt so as to divide the overlay apparatus into two side-by-side portions, one alongside the other, with separate overlay bodies in each portion joined to common support rods and separated by said inner links.

17. The apparatus of claim 16 wherein the overlay bodies of one portion are smaller than the overlay bodies of the other portion so that the curved end portions thereof lie along parallel lines more closely spaced than with the bodies of the other portion.

18. The apparatus of claim 16 wherein the bifurcated end portions have truncated V-shaped tips with generally coplanar end faces.

19. An overlay apparatus for a conveyor belt which extends in a first direction and which includes a plurality of transverse rods, said overlay apparatus comprising:
a wire overlay body comprising an alternating series of double ended straight wire segments and double ended parallel wire segments with central portions of inverted U-shape;
generally arcuate end portions joining the ends of adjacent straight wire and parallel wire segments which are located in the interim of the apparatus;
closed coil portions of ovoid configuration interconnecting the ends of adjacent straight wire and parallel wire segments which are located at the ends of the apparatus; and
the coil portions defining ovoid openings for receiving the transverse rods and confining movement thereof.

20. The apparatus of claim 19 wherein the straight wire segments are generally aligned coplanar one with another to form a planar support surface for the conveyor belt.

21. The apparatus of claim 20 wherein the parallel wire segments are dimensioned such that central portions of the inverted U-shape are aligned coplanar with the straight wire segments to cooperate therewith to form a support surface for the conveyor belt.

22. The apparatus of claim 21 wherein the coil portions are dimensioned so as to be aligned coplanar with the straight wire segments to cooperate therewith to form a support surface for the conveyor belt.

23. A conveyor belt apparatus for moving products in a first direction, having a pair of opposed lateral edges, the conveyor belt providing a series of generally coplanar support surfaces between the edges and having internal components which move to allow the lateral edges to curve in the plane of the support surface, the conveyor belt comprising:
a plurality of transverse rods extending between the lateral edges of the conveyor;
links at the lateral edges of the conveyor interconnecting the ends of the rods;
a plurality of overlay sections, comprising:
a wire overlay body comprising an alternating series of double ended straight wire segments and double ended parallel wire segments with central portions of inverted U-shape;
generally arcuate end portions joining the ends of adjacent straight wire and parallel wire segments located in the interim of the apparatus;
closed coil portions of ovoid configuration interconnecting the ends of adjacent straight wire and parallel wire segments located at the ends of the apparatus; and
the coil portions defining ovoid openings for receiving the transverse rods and confining the movement thereof.

24. The apparatus of claim 23 wherein the rods and links are interconnected so that there is substantially no provision for relative expansive longitudinal movement along one edge of the belt, whereas interconnections of the links along the other edge of the belt permits relative expansive longitudinal movement of an amount sufficient to accommodate an increase in distance which occurs during a transition of the belt from a straight-line path configuration to a curved configuration along a helical path, so that radially outer regions of the belt undergo only longitudinal expansion when the belt changes its orientation during a transition from a straight-line path section to a helical path section.

25. The apparatus of claim 24 further comprising inner links in the interior of the conveyor belt so as to divide the overlay apparatus into two side-by-side portions, one alongside the other, with separate wire overlay bodies in each portion joined to common support rods and separated by said inner links.

26. A conveyor belt apparatus for moving products in a first direction, having a pair of opposed lateral edges, the conveyor belt providing a series of generally planar support surfaces between the edges and having internal components which move to allow the lateral edges to curve generally in the plane of the support surface so as to follow a helical path, the conveyor belt comprising:
  a plurality of transverse rods extending between the lateral edges of the conveyor;
  links at the lateral edges of the conveyor interconnecting the ends of the rods;
  a plurality of overlay sections, each comprising:
  (a) a flat wire overlay body having an upper support surface and an elongated cross-section, bent at regularly spaced intervals to form a sinuous configuration with generally straight interior portions extending from respective curved end portions, so as to form re-entrant bends with pairs of adjacent interior portions, and so that said upper support surface lies in a plane and extends throughout said interior portions and said end portions;
  (b) the flat wire overlay body bent so that the curved end portions thereof are aligned along a pair of spaced generally parallel lines;
  (c) the interior portions aligned generally coplanar with one another and with the end portions; and
  (d) said interior portions defining pairs of apertures for receiving the conveyor belt rods therethrough, the apertures located adjacent the curved end portions; and
  the conveyor belt further comprising inner links in the interior of the conveyor belt so as to divide the overlay apparatus into two side-by-side portions, one alongside the other, with separate overlay bodies in each portion joined to common support rods and separated by said inner links.

27. A conveyor belt apparatus for moving products in a first direction, having a pair of opposed lateral edges, the conveyor belt providing a series of generally planar support surfaces between the edges and having internal components which move to allow the lateral edges to curve generally in the plane of the support surface so as to follow a helical path, the conveyor belt comprising:
  a plurality of transverse rods extending between the lateral edges of the conveyor;
  links at the lateral edges of the conveyor interconnecting the ends of the rods;
  a plurality of overlay sections, each comprising:
  (a) a flat wire overlay body having an upper support surface and an elongated cross-section, bent at regularly spaced intervals to form a sinuous configuration with generally straight interior portions extending from respective curved end portions, so as to form re-entrant bends with pairs of adjacent interior portions, and so t6hat said upper support surface lies in a plane and extends throughout said interior portions and said end portions;
  (b) the flat wire overlay body bent so that the curved end portions thereof are aligned along a pair of spaced generally parallel lines;
  (c) the interior portions aligned generally coplanar with one another and with the end portions; and
  (d) said interior portions defining pairs of apertures for receiving the conveyor belt rods therethrough, the apertures located adjacent the curved end portions; and
  the conveyor belt further comprising inner links in the interior of the conveyor belt so as to divide the overlay apparatus into two side-by-side portions, one alongside the other, with separate overlay bodies in each portion joined to common support rods and separated by said inner links, with the overlay bodies of one portion smaller than the overlay bodies of the other portion so that the curved end portions thereof lie along parallel lines more closely spaced than with the overlay bodies of the other portion.

28. A conveyor belt apparatus for moving products in a first direction, having a pair of opposed lateral edges, the conveyor belt providing a series of generally planar support surfaces between the edges and having internal components which move to allow the lateral edges to curve in the plane of the support surface, the conveyor belt comprising:
  a plurality of transverse rods extending between the lateral edges of the conveyor;
  links at the lateral edges of the conveyor interconnecting the ends of the rods;
  a plurality of overlay sections linking adjacent pairs of transverse rod elements, each comprising:
  a unitary molded overlay body of sinuous configuration having an elongated cross-section, with generally straight interior portions joined at their ends to bifurcated curved end portions to form re entrant bends with pairs of adjacent interior portions, the bifurcated end portions having truncated V-shaped tips with generally coplanar end faces;
  the end portions of the overlay body aligned along a pair of spaced generally parallel lines, one at each end of the overlay body, with the end portions having aligned generally coplanar with one another and with the interior portions; and
  said end portions defining respective apertures for receiving the conveyor belt rods therethrough; and
  the conveyor belt further comprising inner links in the interior of the conveyor belt so as to divide the overlay apparatus into two side-by-side portions, one alongside the other, with separate overlay bodies in each portion joined to common support rods and separated by said inner links.

29. The apparatus of claim 28 wherein the overlay bodies of one portion are smaller than the overlay bodies of the other portion so that the curved end portions thereof lie along parallel lines more closely spaced than with the bodies of the other portion.

30. The apparatus of claim 28 wherein the bifurcated end portions have truncated V-shaped tips with generally coplanar end faces.

* * * * *